United States Patent [19]

Frick et al.

[11] Patent Number: 4,944,187
[45] Date of Patent: Jul. 31, 1990

[54] MULTIMODULUS PRESSURE SENSOR

[75] Inventors: Roger L. Frick, Chanhassen; Stanley E. Rud, Jr., Eden Prairie, both of Minn.

[73] Assignee: Rosemount Inc., Eden Prairie, Minn.

[21] Appl. No.: 289,207

[22] Filed: Dec. 23, 1988

[51] Int. Cl.$^5$ .......................... G01L 7/08; G01L 9/04; G01L 9/12
[52] U.S. Cl. ........................................ 73/718; 73/706; 73/724; 73/726; 338/4; 361/283
[58] Field of Search ................. 73/718, 720, 721, 724, 73/726, 727, 705, 706, 707, 708; 338/4; 361/283

[56] References Cited

U.S. PATENT DOCUMENTS

| | | | |
|---|---|---|---|
| 2,162,308 | 6/1939 | Jenny | 73/729 |
| 2,177,564 | 10/1939 | Havill | 73/729 |
| 2,179,417 | 11/1939 | Maxham | 175/41.5 |
| 2,472,214 | 6/1949 | Hurvitz | 201/48 |
| 3,142,917 | 8/1964 | Spender | 40/37 |
| 3,859,575 | 1/1975 | Lee | 317/246 |
| 4,507,973 | 4/1985 | Barr | 73/724 |
| 4,682,500 | 7/1987 | Uda | 73/705 |

FOREIGN PATENT DOCUMENTS 210421 2/1968 U.S.S.R. .

OTHER PUBLICATIONS

The Physics of High Pressure, P. W. Bridgman, Ph. D., 1931, pp. 149-166, 385-393.

Primary Examiner—Donald O. Woodiel
Attorney, Agent, or Firm—Kinney & Lange

[57] ABSTRACT

A pressure sensor utilizes the effect of different elastic moduli between layers or sections of different material that are bonded together to form a body, so that when the bonded material unit is subjected to a uniform hydrostatic external pressure, the differences in the elastic moduli of each of the materials will cause the materials to deflect in a predictable manner proportional to pressure. The amount of warpage or deflection of the body of material can be measured as a function of pressure. Specifically, two layers of materials, such as silicon and borosilicate glass, which have substantially different elastic moduli can be bonded across an interface surface to form an assembly, and when subjected to a substantially uniform pressure on the exterior surfaces the assembly will deflect for indicating applied pressure at relatively high pressure ranges. The bonded material assembly is placed in a fluid to provide a substantially uniform applied hydrostatic pressure on all exposed surfaces of the bonded material assembly.

25 Claims, 5 Drawing Sheets

MULTIMODULUS PRESSURE SENSOR

BACKGROUND OF THE INVENTION

1. Field of the Invention

The present invention relates to pressure sensors comprising strips or blocks formed of materials selected to cause deflection of the strips or blocks when they are subjected to a static pressure.

2. Description of the Prior Art

Pressure sensors using diaphragms which deflect responsive to a difference between two pressures are well known. By sensing the deflection of the diaphragm in some manner, such as with capacitive sensing, the magnitude of the differential pressure acting to deflect the diaphragm can be determined. It is known that increasing "line pressure" (difference between an ambient pressure surrounding the pressure sensor and an average of the two pressures applied to the diaphragm) on a diaphragm type differential pressure sensor will cause distortions of the sensor housing. When using metal sensing diaphragms, this has been compensated for by varying the prestress level in the metal diaphragm, as well as by selecting and controlling the physical arrangement of the outer housing that deforms.

It also has been observed that when hydrostatic pressure acts on all surfaces of a body it causes the body to compress and rigidify as a function of the elastic moduli of the materials forming the body. It is also well known that a material can be selected to have a different modulus of elasticity or rate of compression from another material and thus will react differently to hydrostatic pressure. However, the deflection of a strip or member formed of two different materials coupled together having different elastic moduli when the strip is subjected to pressure has not previously been used for sensing the magnitude of such pressure.

SUMMARY OF THE INVENTION

The present invention relates to a pressure sensor using a member made of two layers or quantities of solid materials with different elastic moduli, and preferably with similar thermal expansion coefficients which are bonded together or otherwise made substantially integral to form the member. If the materials have the same temperature coefficient of expansion, the member does not deflect responsive to changes in temperature because both of the materials change dimensions similarly when the temperature changes. However, when a hydrostatic pressure surrounding the member is changed, the lengths of the two material layers change to two new dimensions that differ. Because material layers are bonded together or integral, differential movement is restrained and the resulting stresses cause bending, deflection, distortion, curling or bowing of the member. In general, this deflection is much larger than the deflections that would occur in the individual materials in the unbonded condition. In other words, motion amplification is achieved which makes the resulting deflection easier to measure.

The deflection can be sensed by capacitive sensor plates, optical sensors, strain gauges or other similar sensors. Capacitive sensing is sensitive enough to measure the small deflections that occur.

Materials that work in making such a pressure sensor member are silicon and glass, such as Corning 7740 Pyrex (borosilicate glass) or Corning 1729 glass. Silicon and glass can be bonded to one another by anodic bonding, and have similar thermal expansion coefficients. The Corning 1729 glass has a thermal coefficient of expansion closer to silicon than Corning 7740. The elastic moduli of the two materials differ by about two times. For example, silicon has a Young's modulus of approximately $24 \times 10^6$ psi, while borosilicate glass (Pyrex) has a Young's modulus of approximately $10 \times 10^6$ psi.

A third material layer can be added, which preferably has a Young's modulus different from both the other materials. For example, sapphire, which has a Young's modulus of approximately $55 \times 10^6$ psi will work as the third material. Sapphire has a different thermal expansion coefficient as well, and it cannot be anodically bonded. Aluminum nitride also can be used as a third material.

If the deflecting member is made of glass and silicon discs that are bonded together, the deflecting member can be supported in the center and the deflection at the outer edges can be measured with respect to a reference surface on which the disc is supported. Generally, some type of a housing can be utilized for containing a substantially incompressible fluid surrounding the deflecting member, and then the fluid will be varied in hydrostatic pressure through a flexible isolation diaphragm or through some other arrangement so that the hydrostatic fluid pressure being measured will act uniformly around the surfaces of the member, causing the deflection. The sensor measures absolute pressure without the need to provide a reference vacuum chamber, and thus problems arising from leaks in the reference chamber are eliminated.

In different forms of the invention, disc type members that are similar to diaphragms can be supported at edges thereof with respect to a base, and if the disc is properly configured, and hydrostatic fluid pressure is provided around the assembly, the resulting deflections can be measured. Strain gauges can be used for sensing if the deflection is constrained and internal strains are caused.

A cantilever beam can be supported along a surface at one end on a block or base, with a free end of the beam spaced from other parts of the base. If the cantilever beam is made of silicon and the base is made of a glass, such as pyrex, and the beam is bonded along a portion of the length of the beam, the free end of the beam will be deflected when the assembly is subjected to pressure. Additionally, a cantilever beam can itself be made of two layers of different material to form the deflecting member.

The stresses induced because of the differential in dimensional changes between the two interfaced, bonded materials when the assembly is subjected to hydrostatic pressures cause the deflection. The two materials are constrained to substantially the same length at the interface surface, so bending or distortion occurs when pressure is applied. Pressure sensors using the features of the present invention are absolute pressure sensor devices, and are simple enough so that two such elements can be mounted in a housing to obtain an indication of a differential pressure between two pressure sources as shown herein.

The disclosed pressure sensors generally are for high pressure ranges, for example in the range of 10,000 psi and above, but can range from 500 psi to 100,000 psi. Small, compact sensors that are not subjected to high stresses at these high ranges can be simply made and easily monitored for deflection.

In an absolute pressure sensor wherein the member is surrounded with silicone oil, the deflecting members or flexures made from two or more materials can be designed so that when sensing capacitance, the change in spacing will cause an increase or decrease in capacitance. The sensor can thus utilize standard electronic transfer functions so that existing principles of sensing circuitry can be used to cancel out the temperature coefficient of the oil's dielectric constant and also allow use of standard electronics.

DETAILED DESCRIPTION OF THE PREFERRED EMBODIMENTS

Figure 1:
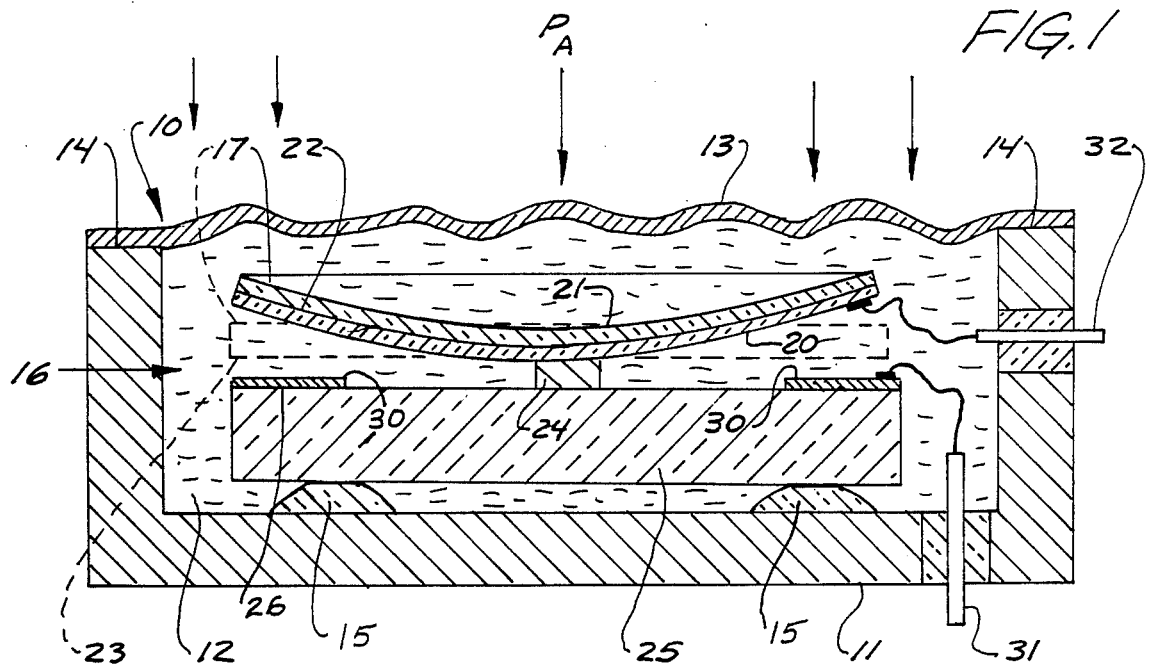
FIG. 1 is a side sectional view of a typical pressure sensor made according to the present invention and showing a deflecting member made according to the present invention installed therein.

In FIG. 1, a pressure sensing assembly indicated generally at 10 comprises an outer closed housing 11, that has an interior chamber 12 filled with a substantially noncompressible fluid such as a silicone oil. Chamber 12 is partially enclosed with a compliant isolation diaphragm indicated generally at 13 that is sealed at 14 along its edges to other portions of the housing. A pressure sensor assembly indicated generally at 16 is mounted inside the chamber 12 and is supported so that it will not slide around substantially in the chamber. The sensor has flexible or compliant mounts 15 for holding it in position. A suitable rubber based material or other elastomer can be used. The sensor assembly 16 includes a flexure sensing member indicated generally at 17 which comprises a bimodulus flexure disc that will deflect from hydrostatic pressure surrounding the flexure member 17. The term "bimodulus" indicates that a structure is formed of two different materials which have different elastic moduli and which are bonded or joined together.

The flexure member 17, as shown, is made up of a first disc 20 made of a first material, in this form, as shown, silicon, and a second disc 21 of equal size and generally equal thickness, which is made of a second material, as shown a suitable borosilicate glass. When silicon and borosilicate glass are used, a preferred sensitivity is obtained when the silicon thickness is close to 0.42 of the total thickness of the bonded layers. The preferred thickness is calculated as:

$$\frac{t_{silicon}}{t_{silicon} + t_{pyrex}} = \frac{y_{pyrex}}{y_{silicon}} = \frac{10 \times 10^6 \text{ psi}}{24 \times 10^6 \text{ psi}} = .42$$

where t is thickness and Y is Young's modulus. The second disc 21 is made of material which has a substantially different elastic modulus from the first disc. The two discs 20 and 21 are securely bonded together, as for example by anodic bonding along their interface 22, which in this case is an interface surface. The discs are fully bonded together and thus made integral. In normal atmospheric pressure the two bonded discs will assume a substantially planar shape as shown in dotted lines at 23. The flexure member 17 is supported with a suitable center support 24 to a base member 25. The base member 25 of the sensor assembly 16 provides a reference surface 26 and is made of a uniform material throughout, for example borosilicate glass.

Because the silicon and glass discs 20 and 21 have different elastic moduli, they will undergo different dimensional changes when subjected to the same hydrostatic pressure on their surfaces. One can visualize that if two discs of equal size were laid one on top of the other and not bonded, and then subjected to a high pressure, the disc with the higher elastic moduli would not reduce in diameter as much as the one with the lower elastic moduli. The pyrex disc would thus become smaller than the silicon disc if they were unbonded. When the two discs are bonded together along their interface a stress is created causing each disc to assume a radius of curvature because of the stress at the interface. The discs will deflect or curl up much like a bi-metal disc which is used for sensing temperature.

As shown in FIG. 1, when the discs 20 and 21 are bonded together to form member 17 and subjected to a high hydrostatic pressure acting on the diaphragm 13, for example in the range of hundreds to thousands psi (hundreds of kilopascals to thousands of kilopascals), the member 17 will deflect, and the distance between the outer portion of the silicon disc 20 and the surface 26 on the glass support base will change. By metalizing the glass support base with a suitable metal layer, a capacitor plate shown at 30 is formed. The electrical capacitance between the conductive silicon layer 20 and the plate 30 varies as a function of pressure. The plate 30 is connected to a suitable lead 31 that passes out through a sealed opening in the outer housing. A suitable lead 32 is electrically connected to the silicon disc 20. Leads 31 and 32 are connected to electronic circuitry, and thus changes in capacitance can be measured as the flexure member 17 deflects.

The amount of deflection is proportional to pressure acting on the flexure member and if the two materials forming the flexure members have matched thermal coefficients of expansion, the sensor will be effective for measuring absolute pressure across a usable working range.

Figure 2:
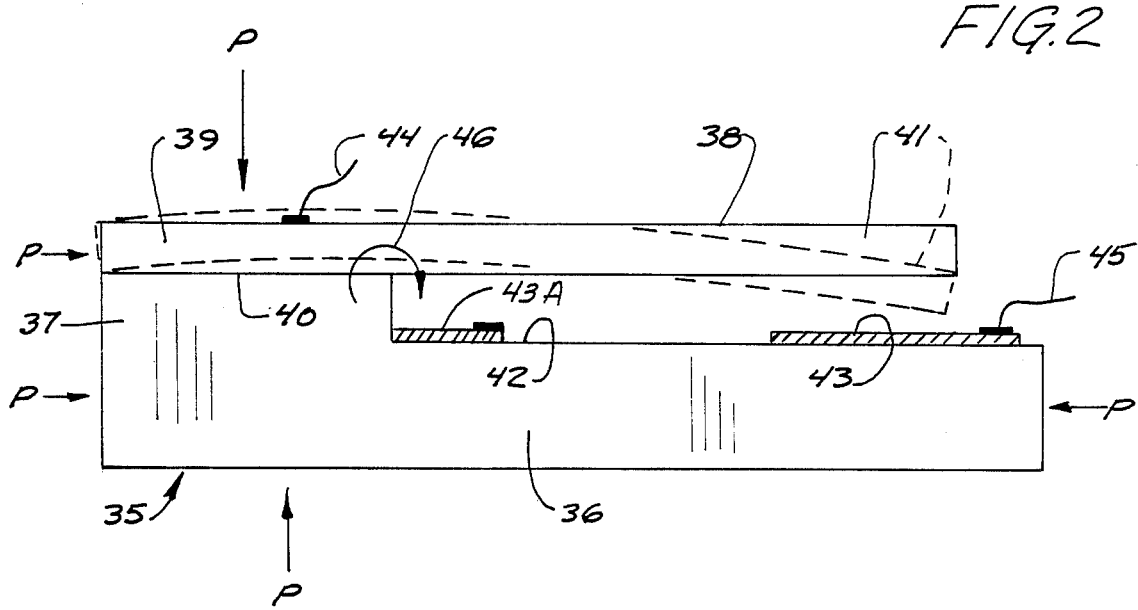
FIG. 2 is a side sectional view of a cantilever type deflecting member used with the pressure sensor of the present invention.

In FIG. 2, a modified flexure member or sensor is illustrated. The flexure member comprising the two solid materials is made in the form of a cantilever beam and support. The beam is made of one material, while the base that supports the cantilever beam is made of a different material having a different elastic modulus from the beam.

In this form of the invention, the pressure sensing element or flexure member indicated generally at 35 comprises a block 36 of borosilicate glass, (pyrex glass). The glass has a raised ledge or boss 37 thereon, on which a beam or blade 38 having a desired width and length, is mounted. The silicon beam 38 has a first portion indicated at 39 bonded along an interface surface 40 to the upper or interface surface of the boss 37. A second free end portion 41 of the beam 38 overlies a recessed or lower surface 42 of the base 36.

Because of the interface at 40, when uniform hydrostatic pressure is applied to the sensing member 35, the differences in the elastic moduli of glass, as opposed to the elastic moduli of silicon will cause stresses to be set up along the interface, generating a moment in the silicon beam, indicated generally by the arrow 46, to cause the free end portion 41 of the beam to deflect as shown in dotted lines. A capacitor plate 43 is formed on the surface 42, near the outer end of the beam portion 41. A suitable lead 44 is connected to the silicon beam which is electrically conductive, and a lead 45 is connected to the capacitor plate 43. The difference in capacitance between the variable capacitor formed between beam 38 and the plate 43 and the relatively fixed capacitance formed between beam 38 and a plate 43A can be measured with suitable circuitry when the silicon beam 38 deflects relative to the base 36. The use of a fixed and variable capacitance having the same dielectric material between them can be used to cancel out variations in the dielectric constant of the oil in the sensor. The sensing member again utilizes two materials having different elastic moduli and having an interface along which the two separate materials are made to be integral. Stresses will be caused when the two materials are subjected to a high pressure to, in turn, cause deflection that can be measured for determining the applied hydrostatic pressure.

Figure 3:
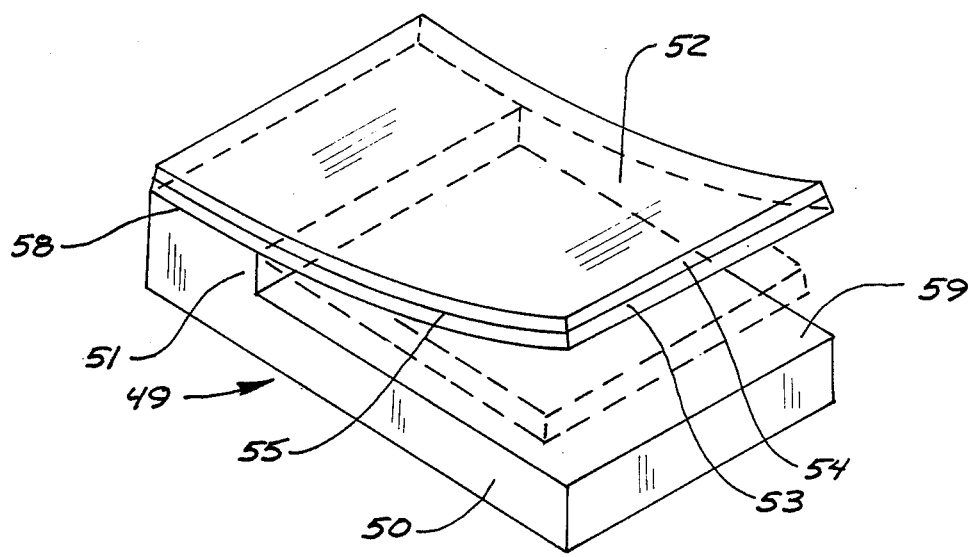
FIG. 3 is a further modified cantilever type sensor made according to the present invention.

In FIG. 3, a further modified cantilever type sensor 49 is illustrated. In this form the sensor 49 includes a base 50 made with a boss 51 at one end thereof. The base 50 is made of suitable material such as glass. A cantilever flexure beam member, indicated generally at 52 is made up of two dissimilar materials. In this case, the beam 52 is made of a lower layer of silicon indicated generally at 53, and an upper layer of borosilicate glass indicated at 54. The layers 53 and 54 are bonded together along an interface 55 forming a unitary solid block. One end portion of the deflecting beam member 52 is bonded to the upper surface of the boss 51 along a surface indicated at 58.

When the sensor 49 is subjected to hydrostatic pressures, the flexure beam member 52 will deflect because of the stress levels along the interface 55. The deflection will occur relative to a surface 59 on which a suitable capacitor plate can be provided for measuring capacitive changes. The flexure beam member can be made to deflect either upwardly or downwardly, depending on the orientation of the layers used.

A third layer could be added and chosen to have a substantially different coefficient of expansion from the other two layers to compensate for any undesired small thermal expansion coefficient mismatch between the first two layers. For instance, the third layer could be a deposited aluminum film on Pyrex or borosilicate glass or a thin film of glass with substantially the same elastic moduli but a higher thermal expansion coefficient could be applied to the borosilicate glass layer by a process such as a fused glass frit, where the layer is fused at a lower temperature than the melting point of the borosilicate glass.

Again, in place of capacitive sensing, optical sensors or other suitable sensors can be utilized. The capacitor plates also can be arranged in any desired manner. For example, split capacitor plates can be applied to the base and series capacitance sensed as the flexure member moves to avoid the need for placing a lead on the flexure member.

Figure 4:
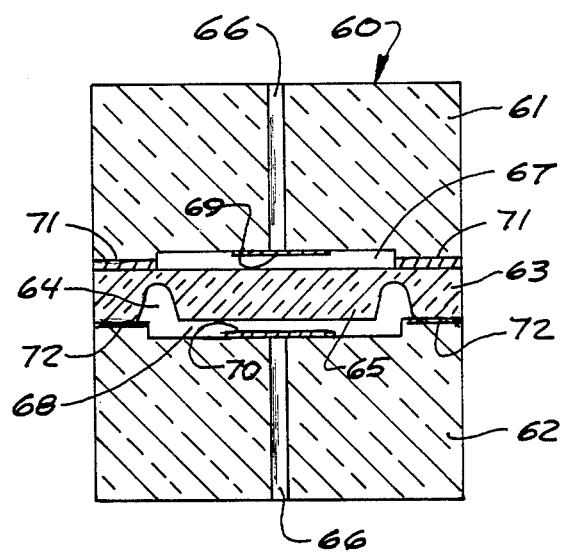
FIG. 4 is a sectional view of a sensor utilizing an asymmetric disc deflecting member.
Figure 5:
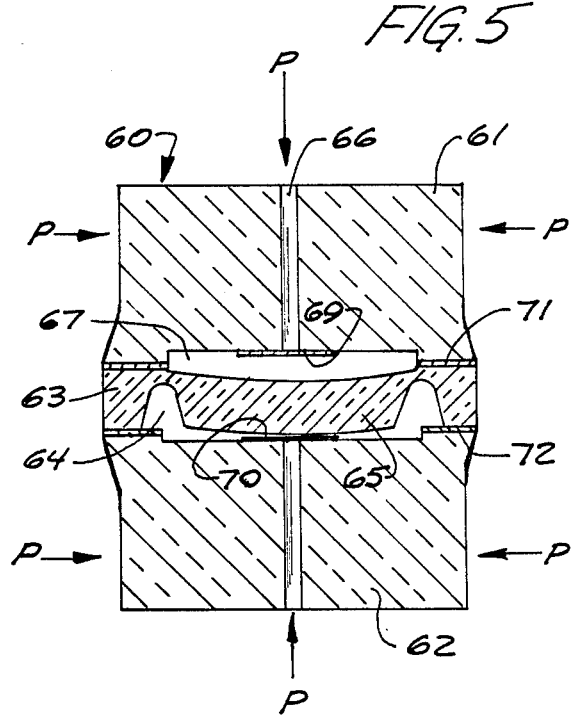
FIG. 5 is a sectional view of FIG. 4 showing the disc generally as it would deform under increased hydrostatic line pressure, and illustrating the use of two capacitors for sensing hydrostatic pressure changes.

FIGS. 4 and 5 show a device that is specifically well adapted for use in capacitive sensing, and in particular utilizing two capacitance sensors that change spacing equally but in opposite sign as the pressure changes, so that the transfer functions used with existing capacitive differential pressure sensors can be utilized for aid in calibration.

In this form of the invention, a flexure member or element indicated generally at 60, which would be placed into an outer housing similar to that shown in FIG. 1, includes a first glass electrode support 61, and a second glass electrode support 62, which in turn are sandwiched onto a disc 63 that is made of a material such as silicon. In this case, the silicon disc is made so that it has a central portion 65 that is asymmetrically supported with respect to a bisecting plane by forming a deep groove 64 inwardly from one surface around the periphery to define the center portion 65. The groove leaves a web supporting the central portion 65 with respect to a rim of the disc 63. Each of the electrode supports 61 and 62 has a pressure opening 66 therein, so that hydrostatic pressure is permitted to enter chambers indicated at 67 and 68, respectively, on opposite sides of the disc 63. The hydrostatic pressure in chamber 67 is the same as the hydrostatic pressure in chamber 68. There is no differential hydrostatic pressure applied across the center portion 65.

The disc 63 deflects as a function of stresses created because of the different elastic modulus of the disc 63 with respect to the electrode supports 61 and 62.

Capacitor plates or electrodes indicated at 69 and 70 are formed on the surfaces of the supports facing the disc 63. The electrodes can be selected to have a surface ratio to cancel out the oil dielectric coefficient change due to temperature. The disc 63, which is made of electrically conductive silicon, forms a common capacitor plate. When the flexure member 60 is subjected to increased pressure from all sides, as shown in FIG. 5, it will deform because the disc 63 has different elastic moduli from the electrode supports. The electrode supports 61 and 62 are bonded to disc 63 at their periphery as indicated at 71 and 72, respectively. When the sensor or flexure member 60 is subjected to hydrostatic pressure, stress will be created and the center portion 65 of the disc will deflect. The deep groove 64, and the narrow, unsymmetrical web it forms causes the center portion 65 to deflect toward the support 62 and the capacitor plate 70. There will be a change in capacitance between the capacitor plate 69 and the disc 63, and between the plate 70 and the disc 63. The change in capacitance between the two sets of plates is of opposite sign.

Figure 6:
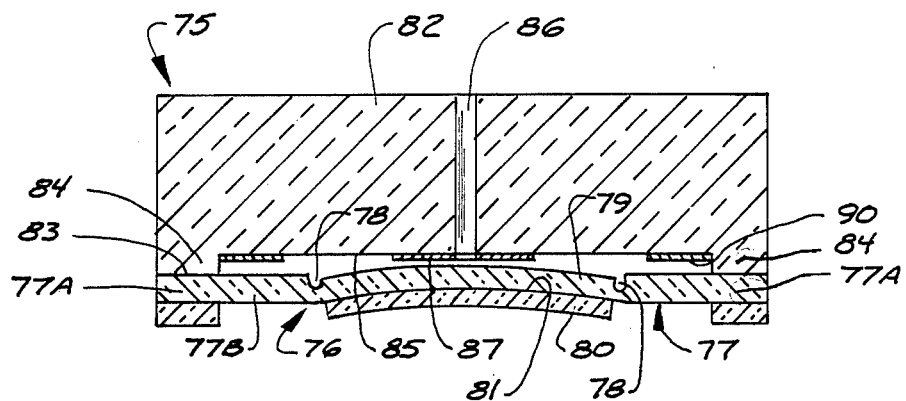
FIG. 6 is a further modified form of the present invention showing a bimodulus disc type deflecting member.

FIG. 6 discloses a modified form of the device of FIG. 4, and comprises a sensor 75 that includes a flexure member 76 which comprises a disc or element 77 made of silicon, for example, having a peripheral groove 78 therein to define a center flexing disc portion 79 against which a disc of glass indicated at 80 is integrally bonded, along an interface surface 81. An electrode support block 82 has a rim 84 bonded to the outer peripheral rim 77A of the silicon disc 77 along a line indicated generally at 83. In this form of the invention, the rim 77A is not supported across its entire surface but an inner unsupported portion 778 of the rim overhangs a portion of an inner base surface 85 of a recess formed in the block 82 by the rim 84. The unsupported portion 778 of the outer pheripheral rim 77A of the silicon disc 77 will not deflect substantially relative to the base surface 85 of the recess formed in the electrode support, because the groove 78 acts as an isolator. The interface surface 83, where the outer periphery of the rim 77A of the disc 77 is bonded, is a peripheral interface surface.

The support block 82 has a passageway 86 leading to the chamber defined by surface 85 and the rim 84 supporting the disc 77, so that when the entire sensor 75 is surrounded by pressurized fluid, that is, the sensor is positioned within a housing such as that shown in FIG. 1, the center portion 79 of the silicon disc will tend to deflect because of the differential in elastic moduli between the silicon and the glass layer or disc 80 that is bonded to the center portion 79. This will cause the spacing between the surface 85 and the center portion 79 of the disc to decrease.

A capacitor plate 87 is mounted on the surface 85 near the center thereof to permit capacitively sensing deflection of the center portion when the disc 77 and the capacitor plate 87 are connected to suitable circuitry.

A reference electrode or capacitor plate indicated generally at 90 is provided adjacent the periphery of the surface 85, close to the rim 84, and this capacitor plate 90 in combination with the overhanging portion 778 of the outer peripheral rim 77A of the disc 77 will provide a reference electrode and thus a reference capacitance for use in the sensing circuitry. The flexure member 76 comprising center portion 79 and glass disc 80 is constructed so that it will deflect at the web that is left below the groove 78 as the hydrostatic pressure increases on both sides of center portion 79 and the integrally bonded glass disc 80. The reference electrode can be provided of a size and in a location where it is subjected to the same incompressible fluid (oil) as the flexure member 76 to permit cancelling out oil dielectric variation effects due to temperature changes.

Figure 7:
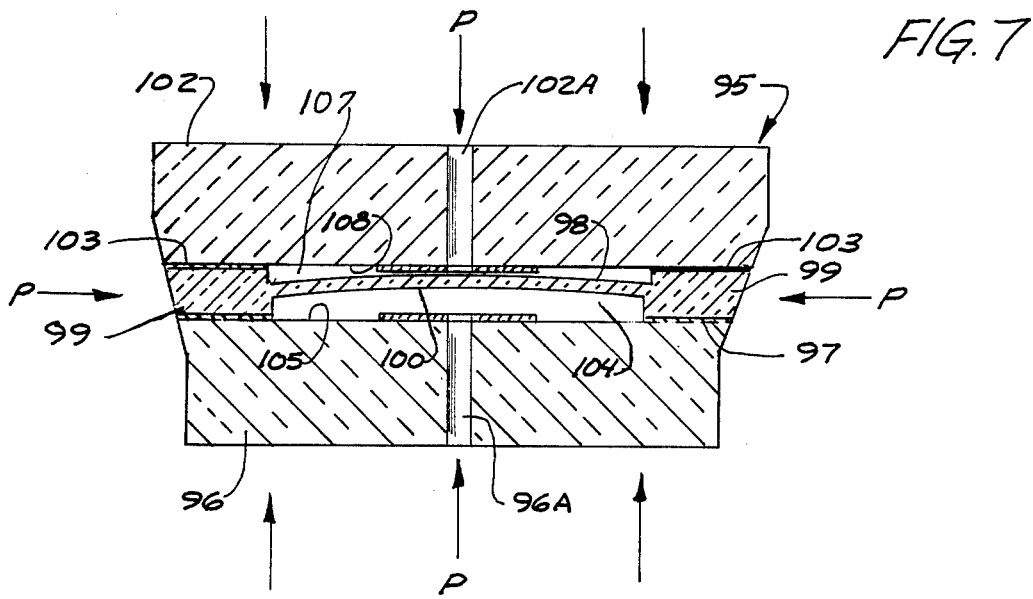
FIG. 7 is a multimodulus sensor made according to the present invention utilizing three different materials for obtaining pressure indicating deflections and also utilizing capacitive sensing.

In FIG. 7, a further modified form of the invention is shown. Three dissimilar materials are bonded together to make the flexure member shown in FIG. 7. When initially made, the outer peripheral dimensions of all three layers of material are substantially the same, and the FIG. 7 showing is while the sensor or flexure member 95 is subjected to high hydrostatic pressures. In this form of the invention, a first glass base or block 96 (again which could be circular or square in plan view) has an interface surface 97 near its outer periphery where it is bonded to a rim 99 of a disc 98 made of silicon. The disc 98 has a center deflecting portion 100 that is reduced in thickness and supported at its periphery by the rim 99.

A third support block, or volume of a third material, indicated generally at 102 comprises a second base or block similar to block 96, but made of a material that has a different, preferably higher, elastic moduli as compared to glass or silicon, and can, for example, be made of sapphire, which has a Young's modulus in the range of $55 \times 10^6$ psi. This block 102 has an interface surface 103 where it is bonded to rim 99 on an opposite surface of the rim 99 from the block 96. Block 96 is, as shown, made of borosilicate glass.

The block 96 has a passageway 96A therethrough to admit fluid under pressure into a chamber 104 that is formed between a surface 105 of the block 96 and the center portion 100 of the disc 98. The block 102 has a passageway 102A for admitting fluid under pressure into a chamber 107 that is defined between the center portion 100 of the silicon disc 98 and a surface 108 of block 102. The same pressure P is applied to both chambers 104 and 107 so that there is no hydrostatic pressure differential across center portion 100. Suitable capacitance plates can be mounted on the surfaces 105 and 108. These surfaces will change in spacing from hydrostatic pressure changes on the flexure member 95 and thus capacitance measured relative to the center portion 100 will change when the flexure member 95 is subjected to a uniform external and internal hydrostatic pressure "P" as shown by arrows in FIG. 7.

It is to be understood that at a low or zero pressure, the blocks or layers 102 and 96, as well as the disc 98 would be substantially the same width dimensions, and the disc 98 would be substantially planar and thus centered between the surfaces 105 and 108.

In this form of the invention moments that are set up adjacent the periphery of the disc 98, because of the integral bonding of the disc between the blocks which have different elastic moduli, cause the center portion 100 to deflect.

In each of the forms of the invention of FIGS. 1–7, small steps or recesses can be formed in the housing section facing the flexure members, or in the flexure members themselves, to provide overpressure stop surfaces that fully support the flexure members during overpressure conditions.

Figure 8:
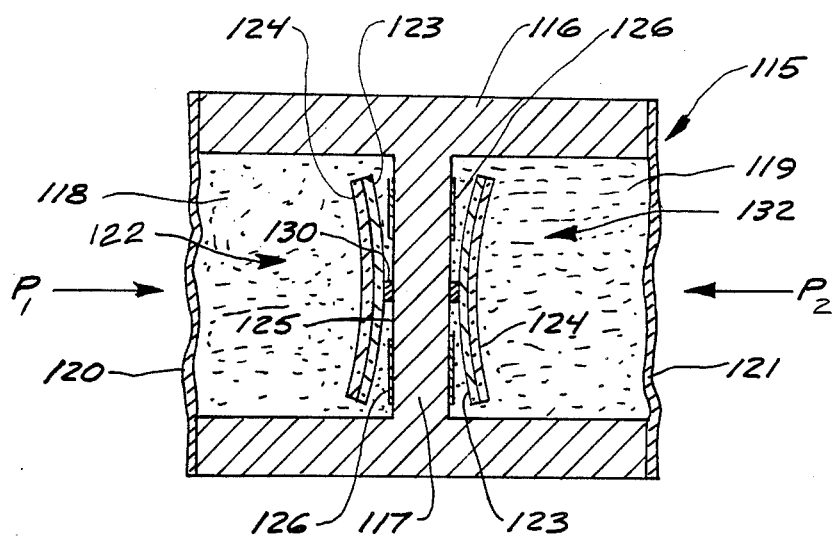
FIG. 8 is a sectional view of a pressure sensor construction utilizing the sensor elements of the present invention for obtaining an indication of pressure differentials between two hydrostatic pressures.

FIG. 8 illustrates a schematic representation of a typical pressure sensor to provide differential pressure measurement between pressures P1 and P2, which are illustrated in FIG. 8, and using the principles of the present invention. In this form of the invention, a differential pressure sensor indicated at 115 includes a housing 116 that has an annular outer wall, and a dividing wall 117 that divides the housing into two chambers, comprising a first chamber 118 and a second chamber 119. These chambers are enclosed with compliant isolation diaphragms 120 and 121, respectively.

The center wall 117 is used to support a first bimodulus pressure transducer indicated generally at 122, which includes a first layer of silicon material 123, and a second layer of a different material such as borosilicate glass indicated at 124. If the silicon layer 123 is adjacent a surface 125 of the wall 117, a suitable metal ring type plate 126 can be deposited on the wall, over a layer of an insulating material, to provide for capacitive sensing between the silicon plate or member 123 and the plate 126.

The bimodulus sensor comprising the bonded together layers of silicon and glass 123 and 124 is supported on a suitable insulating support post 130.

The sensor assembly 132 is constructed in exactly the same manner as sensor 122, and the same numbers have been used for designating the two layers that are bonded together in the sensor 132, which is located in the chamber 119. The chambers 118 and 119 are filled with a suitable incompressible fluid, so that as the hydrostatic pressures P1 and P2 are applied the layers will tend to deflect as previously explained because of the difference in elastic moduli, and the amount of deflection can be measured by the capacitive sensing plates comprising the surface of the disc or plate 123 of each of the sensors and the metallic capacitive plate 126 that is deposited on an insulating layer.

The differential in pressure can be derived because of the difference in deflection between the two sensors 122 and 132 under different hydrostatic pressures.

Figure 9:
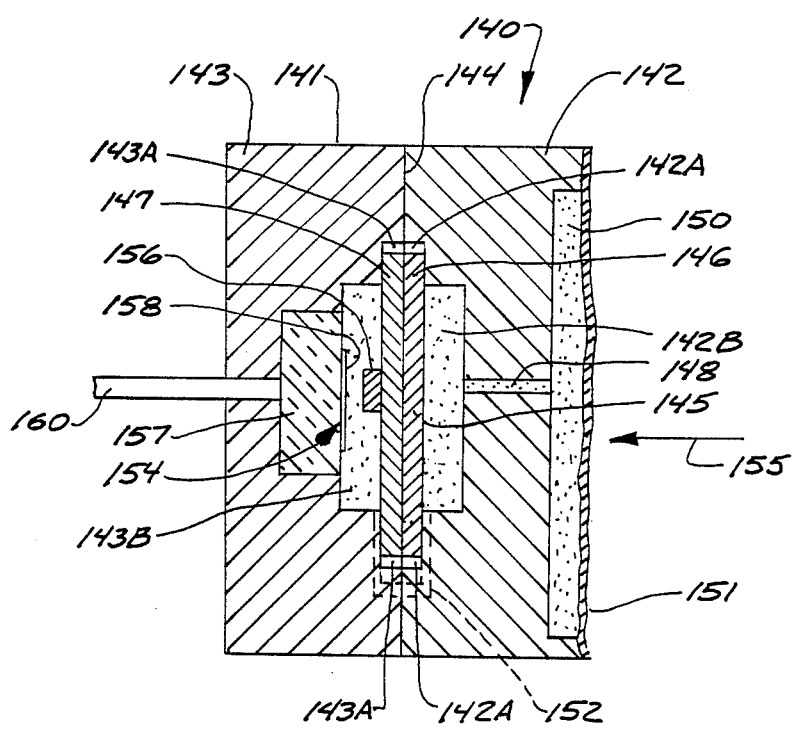
FIG. 9 is a schematic representation of a pressure sensor having an optical component for determining deflection of a sensor element made according to the present invention.

In FIG. 9, a further modified form of the invention is illustrated and comprises a pressure sensor 140 that in this form of the invention shows a deflection sensor such as that of the Fabry-Perot type. In this form of the invention, a housing 141 is divided up into two sections, 142 and 143. The housing can be made of suitable materials, and each of the housing sections has a partial gap indicated generally at 142A and 143A, along the junction line 144 to receive a bimodulus element or member indicated generally at 145. The bimodulus element 145 includes a first plate or portion 146 that is made of a suitable first material, such as silicon, and a second plate or portion 147 made of a material having a different elastic moduli from the first material. For example, second plate 147 could be the borosilicate glass used in connection with a silicon layer. These two layers are bonded together, as was previously explained. Each of the housing sections also has a deeper recess indicated at 142B and 143B, respectively, that overlies at least the center portions of the plates, while the edges of the bimodulus element 145 are retained in the recesses 142A and 143A. The recesses 142A and 143A will provide clamping when the sensor housing sections 142 and 143 are positioned to securely hold the bimodulus element 145.

The chamber formed by the recess 142B is filled with a suitable incompressible fluid, and is joined with a passageway 148 to an isolation chamber 150, on an outer face of the housing section 142. The isolation chamber is closed with a suitable, flexible isolation diaphragm 151 which encloses the incompressible fluid so that the chamber 142B, the passageway 148, and the chamber 150 are all filled with this incompressible fluid. In addition, one or more suitable passageways indicated at 152 in dotted lines is formed between the mating sections 142, 143 of the housing 141, so that there will be fluid communication between the chambers 142B and 143B. The chamber 143B is also filled with the incompressible fluid.

In this form of the invention, an optical deflection sensor 154 known as a Fabry-Perot sensor is used for determining the deflection of the bimodulus element 145 when it is subjected to a hydrostatic pressure that would be applied as indicated by the arrow 155 against the outer surface of the isolation diaphragm 151. The sensor 154 includes an optically reflective element 156 that is mounted onto the plate or layer 147 of the bimodulus element. The housing section 143 has a chamber filled with a suitable glass material indicated at 157 that has a partially reflective, partially transmissive plate 158 on the outer side thereof facing the element 156. An optical fiber 160 can be provided in the housing 143, and transmission of light that will change depending on the position of the element 156 can be used as a signal to determine the deflection of the bimodulus element 145. The Fabry-perot sensor is an interferometer type sensor, and a typical optical technique that could be utilized with the present invention is shown in British Specification No. 2,086,572 A (U.S. Pat. No. 4,428,239, which are incorporated herein by reference). The deflection of one side of the deflecting bimodulus element is sensed with the present invention as disclosed.

Thus, other types of deflection sensors, including other types of optical deflection sensors, can be used as desired.

Figure 10:
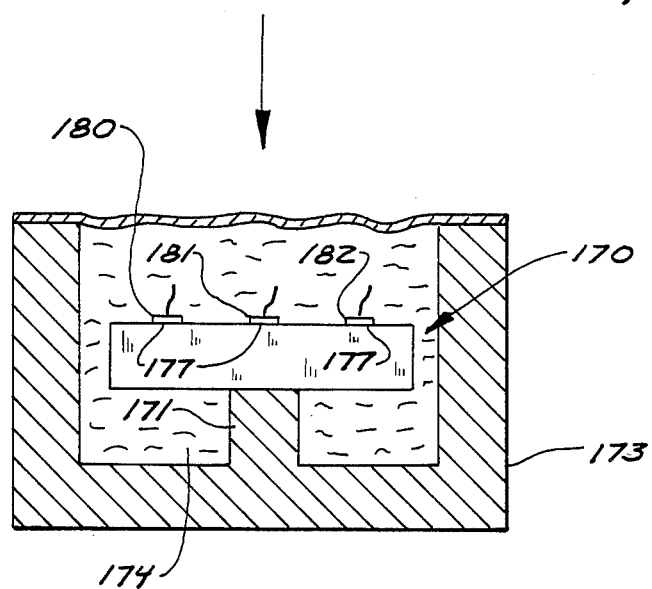
FIG. 10 is a schematic representation of a pressure sensor of the present invention using a strain gauge as one bimodulus element for sensing pressure.

In FIG. 10, a form of the invention illustrating the use of strain gauges on a bimodulus member being subjected to hydrostatic pressures is illustrated. A unitary block member 170 formed of Pyrex is mounted on a pedestal 171 to the wall of a housing 173 that has an interior chamber 174. A hydrostatic pressure in chamber 174 acts on all sides of the flexure block 170. Thin film strain gauges 180, 181 and 182 are bonded on the upper surface of block 170. The strain gauges are formed of silicon. The block 170 and the strain gauges 180-182 are two dissimilar materials having different moduli of elasticity which are integrally joined by deposition together along an interface line or surface 177.

Subjecting the flexure block 170 to hydrostatic pressure will cause the block to tend to compress as previously explained, and since the silicon strain gauges do not compress at the same rate, stresses will be set up, and these can be measured with strain gauges 180, 181 and 182. The strain gauges can be formed of doped silicon in any known manner. The strain gauges can be oriented in any desired manner and are shown merely schematically, for illustrative purposes, to indicate that stresses set up on the unitary block member 170 can be sensed with strain gauge sensing means to provide an output that is indicative of a hydrostatic pressure in the chamber 174.

Strain gauges can be applied on other forms of the invention as well. It should be noted that the unitary flexure block 170 will be surrounded by the pressure, and that it is spaced from all of the walls of the chamber 74 except where it is supported on pedestal 171.

Thus, unitary block flexure members or elements made of at least two different solid materials, each of which has a discrete volume and which is integrally interfaced with the other material, and wherein the materials have substantially different elastic moduli, can be subjected to a hydrostatic pressure on the outer surfaces of the unitary block flexure member. The pressure changes cause internal stresses at the interface of the two volumes of material and result in deflection of the unitary block flexure member. The deflection or distortion is measured by suitable means for indicating such deflections, such as with capacitive sensing, optical sensing or the like.

The unitary block member can be integrally formed if desired, for example by oxidizing a portion of a block of silicon. Electrical feed through connections for the sensing means can be accomplished by methods known from sensing diaphragm type pressure sensors.

Although the present invention has been described with reference to preferred embodiments, workers skilled in the art will recognize that changes may be made in form and detail without departing from the spirit and scope of the invention.

What is claimed is:

1. A pressure sensor comprising:

a first quantity of solid material defining a volume having interface means thereon;

a second quantity of solid material having a different modulus of elasticity from the first quantity of material and having interface means thereon engaging the interface means of the first quantity of material for forming a unitary solid body;

means for simultaneously applying a substantially uniform hydrostatic pressure on surface portions of both the first and second quantities of material of the unitary body tending to compress the quantities of material at the interface means, whereby the unitary body will be stressed as a function of applied pressure; and means associated with at least a portion of the unitary body for providing a signal indicating the applied hydrostatic pressure.

2. The pressure sensor as specified in claim 1 wherein said first and second quantities of material are selected to have substantially the same thermal coefficient of expansion.

3. The pressure sensor as specified in claim 1 wherein said interface means of the first and second materials comprise interface surfaces, said interface surfaces being bonded together whereby stresses are created when the unitary body formed of the first and second materials is subjected to external hydrostatic pressure.

4. The pressure sensor as specified in claim 3 wherein said two quantities of material comprise a uniform thickness layer when bonded together, the pressure sensor further comprising first means for mounting said layer with respect to a reference surface, and the means associated for indicating pressure comprising second means sensing deflection of said layer relative to the reference surface.

5. The pressure sensor as specified in claim 1 wherein said interface portions comprise surfaces that are bonded together.

6. The pressure sensor as specified in claim 1 wherein said first quantity comprises a beam, and the second quantity comprises a support, said beam and support being bonded together along interface portions of each of the beam and support, and other portions of said beam and support being spaced from each other whereby deflections between the two other portions occurs as a function of hydrostatic pressure in the interface portions of the beam and support.

7. The pressure sensor as specified in claim 1 wherein the means associated for indicating the applied hydrostatic pressure comprises optical sensing means to sense deflection of the unitary body with respect to a reference position.

8. The pressure sensor as specified in claim 7 wherein the optical sensing means comprise an interferometer for sensing the deflection.

9. The pressure sensor of claim 1 in combination with a housing having a dividing wall separating the housing into first and second separate chambers, a first unitary body mounted in a first chamber and a second unitary body mounted in the second chamber, the means associated for indicating the applied pressure comprising means for separately indicating the deflections of the respective first and second bodies relative to the housing, the first and second chambers being subjected to different hydrostatic pressures so the means for separately indicating deflections provides an indication of the differential in hydrostatic pressure between the first and second chambers.

10. The pressure sensor of claim 1 wherein said means associated for indicating pressure comprises strain gauge means sensing strain in the unitary body.

11. The pressure sensor of claim 1 wherein the means associated for indicating pressure comprise a capacitor sensing the deflection.

12. The pressure sensor of claim 1 wherein strain gauge means are integrally formed on the first quantity of solid material thereby forming the second quantity of material to indicate stress in the unitary body caused by hydrostatic pressure on the unitary body.

13. A pressure sensor apparatus comprising:

a unitary body flexure member of two solid materials, the unitary body being made of a first quantity of material defining a first volume of solid material;

a second quantity of material having a different elastic moduli from the first quantity of material defining a second volume of solid material, the first and second volumes of material being integrally formed along an interface portion; and means for applying a substantially uniform hydrostatic pressure on exposed portions of both of the first and second quantities of material of the unitary body flexure member and tending to change the volume of both the first and second quantities to affect the interface portions sufficient to cause measurable deflection of at least portions of the unitary body flexure member from a reference position as a function of applied pressure.

14. The apparatus as specified in claim 13 wherein said first and second volumes of material are selected to have substantially the same thermal coefficient of expansion.

15. The apparatus as specified in claim 14 wherein said two volumes of solid material comprise a substantially uniform thickness layer when bonded together, first means to mount said layer with respect to a reference surface, and second means sensing deflection of said layer relative to the reference surface.

16. The pressure sensor of claim 15 wherein said second means comprises capacitive deflection sensing means on the reference surface and on the layer which permit determining the pressure related deflection of said layer.

17. The pressure sensor of claim 15 wherein said second means comprises an optical means for sensing deflections of the layer.

18. The pressure sensor of claim 17 wherein the optical means further comprise an interferometer.

19. The pressure sensor of claim 13 and a layer of a third material bonded to the first mentioned layer, said third material having a different thermal expansion coefficient from the other materials selected to reduce temperature induced deflection errors of the pressure sensor.

20. An apparatus for sensing a fluid pressure, comprising:

a first body disposed in the fluid having a first surface, the pressure tending to compress the first body at a first rate;

a second body disposed in the fluid having a second surface joined to the first surface, the pressure tending to compress the second body at a second rate different from the first rate;

the pressure compressing the joined bodies at different rates to cause the joined bodies to distort; and means attached to the joined bodies for sensing the distortion and converting to an output indicating the pressure.

21. The apparatus of claim 20 wherein the joining constrains a length on the first surface to be substantially equal to a length on the second surface, thereby distorting the joined bodies.

22. The apparatus of claim 20 wherein the pressure causes the joined first and second surfaces to curl, and the sensing means sense the curling.

23. An apparatus for sensing a fluid pressure, comprising:
a body disposed in the fluid having a first region which the pressure tends to compress at a first rate integral with a second region which the pressure tends to compress at a second rate, different from the first rate, the pressure distorting the body due to the difference in the rates of compression; and
means attached to the body for sensing the distortion of the body and providing an output signal indicative of the pressure.

24. The apparatus of claim 23 wherein the pressure causes the body to bow, and the sensing means sense the bowing of the body.

25. The apparatus of claim 24 wherein the body is a strip bowing along its length responsive to the pressure.

* * * * *